(12) United States Patent
Hickling

(10) Patent No.: US 6,209,896 B1
(45) Date of Patent: Apr. 3, 2001

(54) VEHICLE SUSPENSION ATTACHMENT ASSEMBLIES

(75) Inventor: Gregory J. Hickling, Swansea (GB)

(73) Assignee: Meritor Heavy Vehicle Systems Limited, Troy, MI (US)

( * ) Notice: Subject to any disclaimer, the term of this patent is extended or adjusted under 35 U.S.C. 154(b) by 0 days.

(21) Appl. No.: 09/406,357

(22) Filed: Sep. 28, 1999

(51) Int. Cl.[7] .................................................. B60G 11/23
(52) U.S. Cl. .................................................. 280/124.169
(58) Field of Search ...................... 280/124.169, 124.153, 280/124.166, 684, 679, 681, 687; 267/276, 279, 154

(56) References Cited

U.S. PATENT DOCUMENTS

| | | | |
|---|---|---|---|
| 3,674,285 | * 7/1972 | Grosseau | 280/724 |
| 3,817,550 | * 6/1974 | Young | 280/680 |
| 4,171,920 | * 10/1979 | Kramer et al. | 403/223 |
| 4,256,327 | * 3/1981 | Leinweber | 280/684 |
| 5,149,305 | * 9/1992 | Gordon | 474/101 |
| 5,649,719 | 7/1997 | Wallace et al. . | |

* cited by examiner

Primary Examiner—Eric Culbreth
Assistant Examiner—Faye M. Fleming
(74) Attorney, Agent, or Firm—Carlson, Gaskey & Olds

(57) ABSTRACT

Attachment assemblies for attaching suspension components within a vehicle suspension assembly are provided. First, a bracket assembly having an axle beam utilizes a one piece bracket to improve the structural rigidity of the axle beam and provides the attachment points for the control rods, brake chambers, and air springs. Next, a torsion attachment assembly attaches the torsion assembly to suspension supports using a bushing that fits within a first cylindrical bore in the torsion assembly. A plug is received within a hole in the support and secured to the support by fasteners. A shaft on the plug fits within a second cylindrical bore in the bushing. In this way, the torsion assembly is free to rotate about the plug and the torsion assembly can be easily disconnected from the supports when the fasteners are removed. Finally, a control rod attachment assembly utilizes a pin having tapered ends and a fastening device to secure a control rod end to a supporting structure. The tapered ends of the pin mate with tapered openings in the control rod end and supporting structure. The fastening device ensures that the tapered ends are firmly seated in the tapered openings by pulling the control rod end and supporting structure together.

3 Claims, 4 Drawing Sheets

VEHICLE SUSPENSION ATTACHMENT ASSEMBLIES

BACKGROUND OF THE INVENTION

The present invention relates to improvements to suspension assemblies for vehicles.

Known assemblies used to attach suspension components to one another and to other components in heavy duty truck suspension systems can be expensive and make installation and removal of the suspension components rather difficult. For example, suspension components attach the axle beam to the vehicle frame. Typically, the suspension components have been attached to the axle beam using several individual brackets which increases the cost and complexity of the suspension system.

Another example is the attachment assemblies used to attach torsion assemblies to supports. One prior art device has used split bushes which are clamped around a portion of the torsion assembly. However, this design is susceptible to wear due to ingestion of foreign particles into the assembly. Other prior art devices often require the disassembly of many components to remove the torsion assembly from the supports.

Prior art attachment assemblies used to attach control rods to supporting structures have been relatively expensive. Pins having a cylindrical end and a tapered end have typically been used to connect the control rod to a supporting structure. The cylindrical end is press fit into the supporting structure and the tapered end is received in a complementary tapered opening in an end of the control rod. The tapered end also has a threaded feature that secures the pin to the control rod end. The threaded feature and press fit make the attachment assembly of the prior art more costly and difficult to assemble.

SUMMARY OF THE INVENTION AND ADVANTAGES

The present invention provides several distinct improvements to attachment assemblies for attaching suspension components within a vehicle suspension assembly. First, a bracket assembly having an axle beam utilizes a one piece bracket to improve the structural rigidity of the axle beam and eliminates individual brackets by providing the attachment points for the control rods, brake chambers, and air springs.

Second, a torsion attachment assembly attaches the torsion assembly to suspension supports by utilizing a bushing that fits within a first cylindrical bore in the torsion assembly. A plug is received within a hole in the support and secured to the support by fasteners. A shaft extending from the plug fits within a second cylindrical bore in the bushing. In this way, the torsion assembly is free to rotate about the plug and the torsion assembly can be easily disconnected from the supports when the fasteners are removed.

Finally, a control rod attachment assembly utilizes a pin having tapered ends and a fastening device to secure a control rod end to a supporting structure. The tapered ends of the pin mate with tapered openings in the control rod end and supporting structure. The fastening device, having a bolt and nut, ensures that the tapered ends are firmly seated in the tapered openings by pulling the control rod end and supporting structure together.

BRIEF DESCRIPTION OF THE DRAWINGS

Other advantages of the present invention will be readily appreciated by reference to the following detailed description when considered in connection with the accompanying drawings wherein.

DETAILED DESCRIPTION OF THE PREFERRED EMBODIMENT

Figure 1:
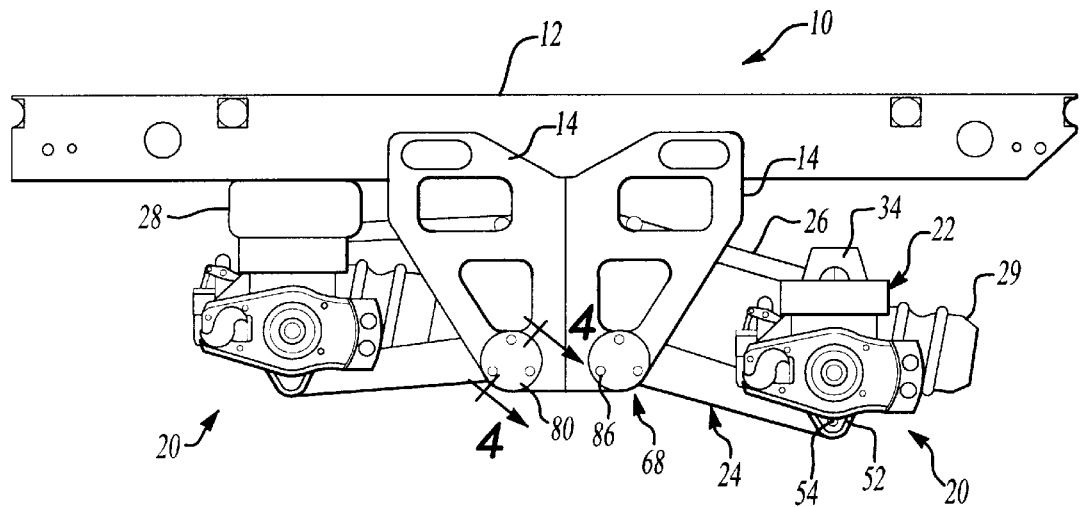
FIG. 1 is side elevational view of a vehicle suspension for a heavy duty truck.

Referring to FIG. 1, a vehicle suspension system for a heavy duty truck is shown generally at 10. Vehicle suspension 10 has a main "H" or ladder frame 12 and supports 14 depending downwardly therefrom which support the suspension components to absorb the various loads imparted on the vehicle. An axle assembly 20 is attached to each support 14 and permitted to move up and down as demonstrated by the different positions of the left and right axle assemblies in FIG. 1.

Axle assembly 20 has a bracket assembly 22 attached to support 14 by torsion assemblies 24 and control rods 26. Air bags or air springs 28 are disposed between bracket assembly 22 and main frame 12 and dampen the up and down movement of axle assemblies 20. Air springs 28 are only shown on the left axle assembly in FIG. 1 to provide a better view of the other suspension system components. Brake chambers 29 are also mounted onto bracket assembly 22 in proximity to the wheels (not shown).

Referring to FIGS. 2A–2D, bracket assembly 22 includes an axle beam 30 having distal ends 32 for supporting wheels. The present invention provides a bracket 34 affixed to axle beam 30 between distal ends 32 for providing attaching points for vehicle and suspension components, such as control rods 26, air springs 28, and brake chambers 29. Previous configurations of axle assemblies have included numerous secondary brackets to attach vehicle and suspension components to the axle beam. The bracket 34 of the present invention consolidates many of these secondary brackets into one bracket while providing additional stiffness to the axle beam. The A-shape structure of the bracket 34 controls fore, aft, and lateral forces imparted on the axle beam 30.

Figure 2A:
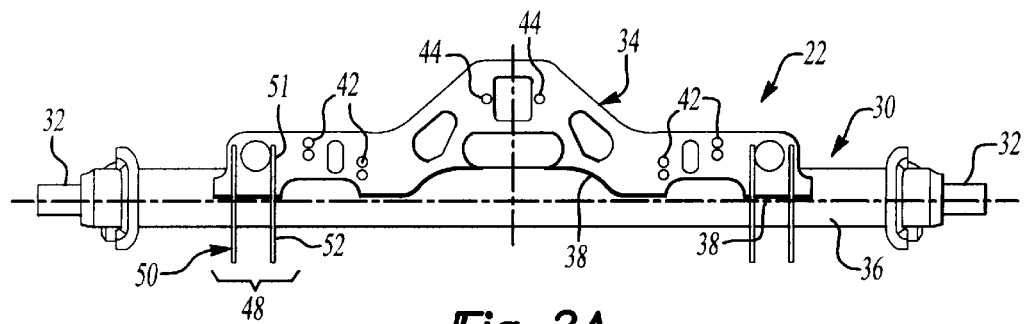
FIG. 2A is a front elevational view of a beam assembly of the present invention.
Figure 2B:
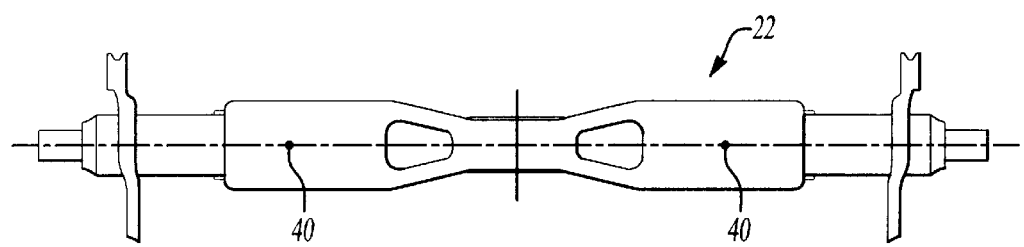
FIG. 2B is a top elevational view of the beam assembly of the present invention.
Figure 2C:
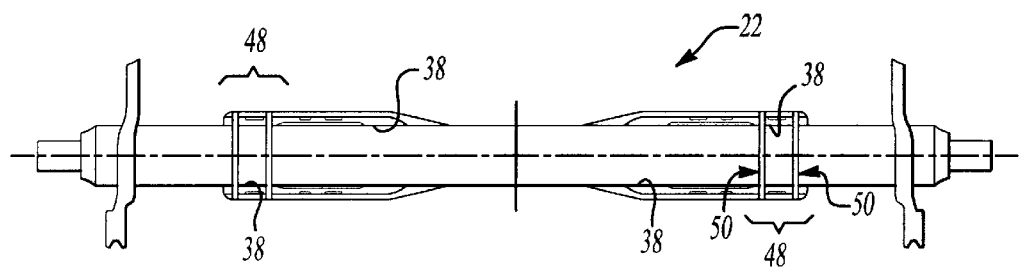
FIG. 2C is bottom elevational view of the beam assembly of the present invention.
Figure 2D:
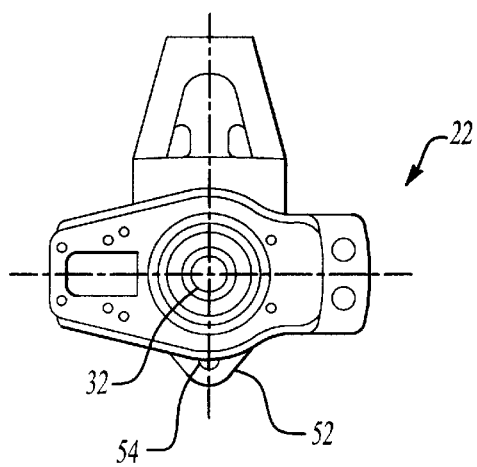
FIG. 2D is a side elevational view of the beam assembly of the present invention.

Bracket 34 has opposing edges 38 which are welded to an outer surface 36 of axle beam 30, best shown in FIGS. 2A and 2C. Opposing edges 38 are welded to axle beam 30 along a neutral bending axis to improve the structural integrity of bracket assembly 22.

Bracket 34 includes a plurality of apertures for attaching a plurality of vehicle and suspension components to axle beam 30 via bracket 34. As shown in FIG. 2B, bracket 34 has a first group of apertures 40 to which air springs 28 are attached. A second group of apertures 42, shown in FIG. 2A, is utilized for attaching brake chambers 29 to bracket 34. Bracket 34 also includes a third group of apertures 44 to which control rods 26 are attached. In this manner, a single bracket 34 attaches control rods 26, air springs 28, and brake chambers 29 to axle beam 30 while improving the structural rigidity of axle beam 30.

Bracket assembly 22 also includes a pair of support brackets 48 that connect torsion assembly 26 to axle beam 30. Each support bracket 48 including a pair of parallel plates 50, best shown in FIGS. 2A and 2C, having upper 51 and lower 52 portions. Upper portions 51 are welded to axle beam 30 and bracket 34 and lower portions 52 depend downwardly from upper portions 51. Lower portions 52 have a fourth group of apertures 54, shown in FIG. 2D, to which torsion assemblies 24 are attached. Support brackets 48 and bracket 34 together improve the structural rigidity of axle beam 30 while providing structurally sound anchoring points for the suspension components. In this manner, loads may be transmitted from the wheels through the suspension components to the frame 12 without undesirable distortion to the axle beam 30 and bracket 34.

Figure 3:
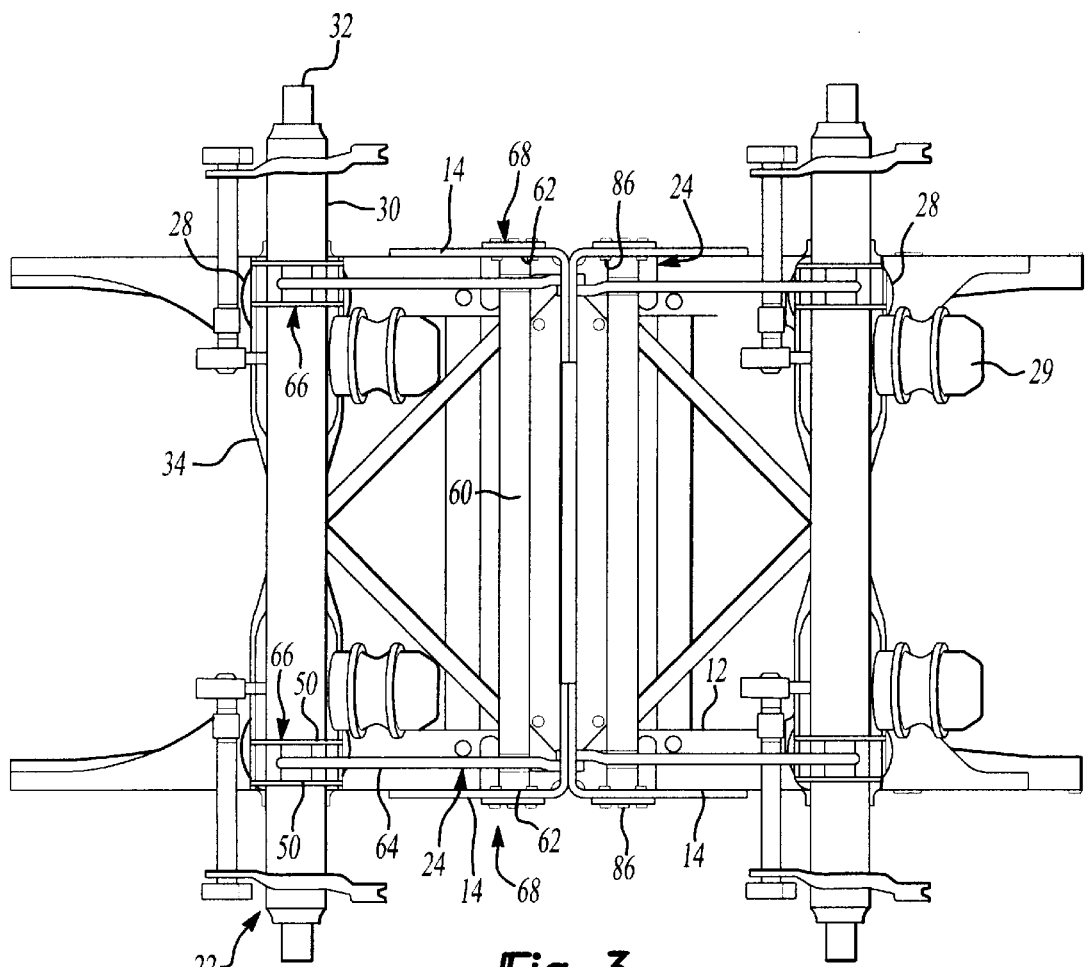
FIG. 3 is bottom elevational view of the vehicle suspension shown in FIG. 1.

Referring now to FIG. 3, the torsion assemblies 24 are shown connecting bracket assemblies 22 to L-shaped supports 14. Torsion assembly 24 has a tubular beam 60 extending between opposing supports 14. Beam 60 includes opposing ends 62 that are positioned adjacent to and pivotally supported by opposing supports 14. A pair of parallel arms 64 extend from each opposing end 62 and terminate at distal ends 66. Distal ends 66 are pivotally attached to lower portions 52 of plates 50 at apertures 54. In this manner, bracket assemblies 22 are pivotally attached to supports 14 thereby permitting bracket assemblies 22 to travel up and down.

Figure 4:
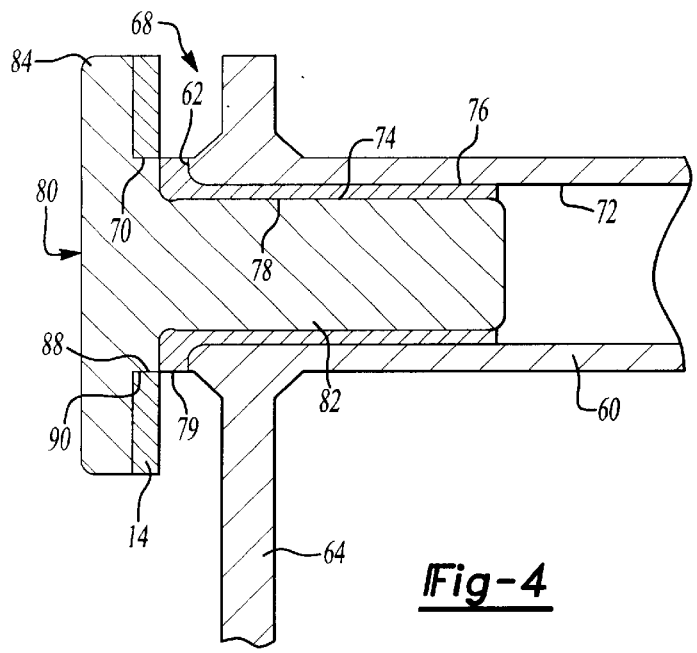
FIG. 4 is a cross-sectional view of an attachment assembly of the present invention taken along line 4—4 in FIG. 1.

In the present invention, tubular beam 60 is attached to supports 14 by attachment assembly 68, best shown in FIG. 4. Unlike prior art attachment assemblies, the assembly of the present invention permits easy installation and removal of the torsion assemblies 26 from the supports 14, as will be appreciated by the discussion below.

Supports 14 include a mounting hole 70 which is used to attach beam 60 to support 14 by attachment assembly 68. Beam 60 includes a first cylindrical bore 72. A bushing 74 has an outer surface 76 and is disposed within first cylindrical bore 72 so that bore 72 and surface 76 are in engagement with one another. Bushing 74 has a second cylindrical bore 78 therethrough and a flange 79 at one end in abutting relationship with end 62.

A plug 80 has a shaft 82 with a flange 84 at one end. Shaft 82 extends through hole 70 and is disposed within second cylindrical bore 78 so that shaft 82 and second cylindrical bore 78 are in engagement with one another. Flange 84 has a plurality of apertures therethrough (not shown) for receiving fasteners 86 (shown in FIGS. 1 and 3) and attaching plug 80 to support 14. Plug 80 also includes a shoulder 88 adjacent flange 84 and extending from shaft 82. Shoulder 88 has a perimeter 90 for engaging hole 70 and locating shaft 82 within hole 70 of support structure 14. Bushing flange 79 is interposed between end 62 of beam 60 and shoulder 88.

In operation, plug 80 isolates torsional deflection of torsion assembly 24 by permitting torsion assembly 24 to pivot about shaft 82. Shoulder 88 on plug 80 prevents lateral movement of torsion assembly 24 since shoulder 88 abuts flange 79 which is in abutting relationship with both ends 62 of tubular beam 60. Torsion assembly 24 may be removed easily from supports 14 by removing fasteners 86 and plugs 80.

Figure 5A:
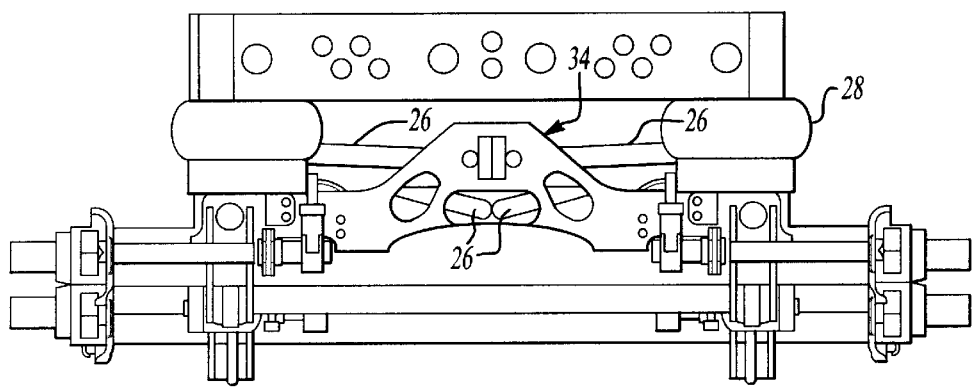
FIG. 5A is front elevational view of the vehicle suspension shown in FIG. 1.
Figure 5B:
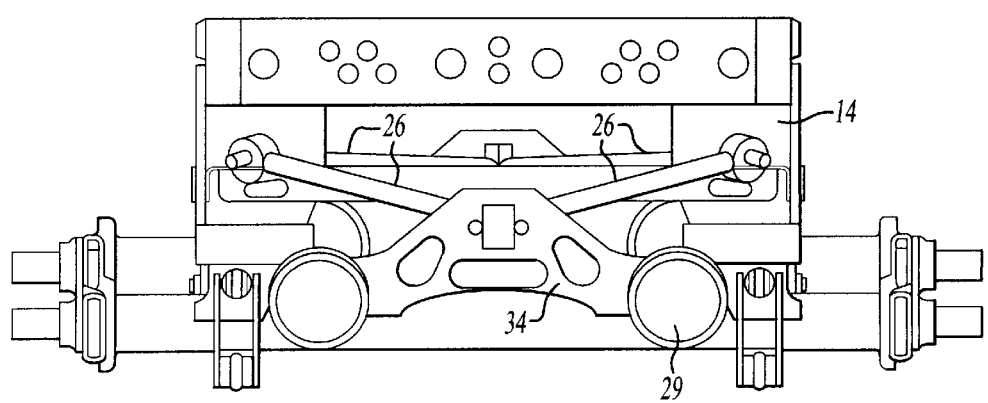
FIG. 5B is a rear elevational view of the vehicle suspension shown in FIG. 1.

Control rods 26 constrain the lateral motion of bracket assemblies 22 and react to brake forces. Referring to FIGS. 5A and 5B, control rods 26 are configured in a V-shape and interconnect L-shaped supports 14 and bracket 34. However, control rods may be configured in any number of ways to achieve different ride and handling characteristics. Prior art attachment assemblies secure the control rod end to the supporting structure by a pin having several specially machined features. The control rod attachment assembly of the present invention eliminates the rather costly pin of the prior art and replaces it with a simplified pin and a standard bolt, a nut, and washers.

Figure 6:
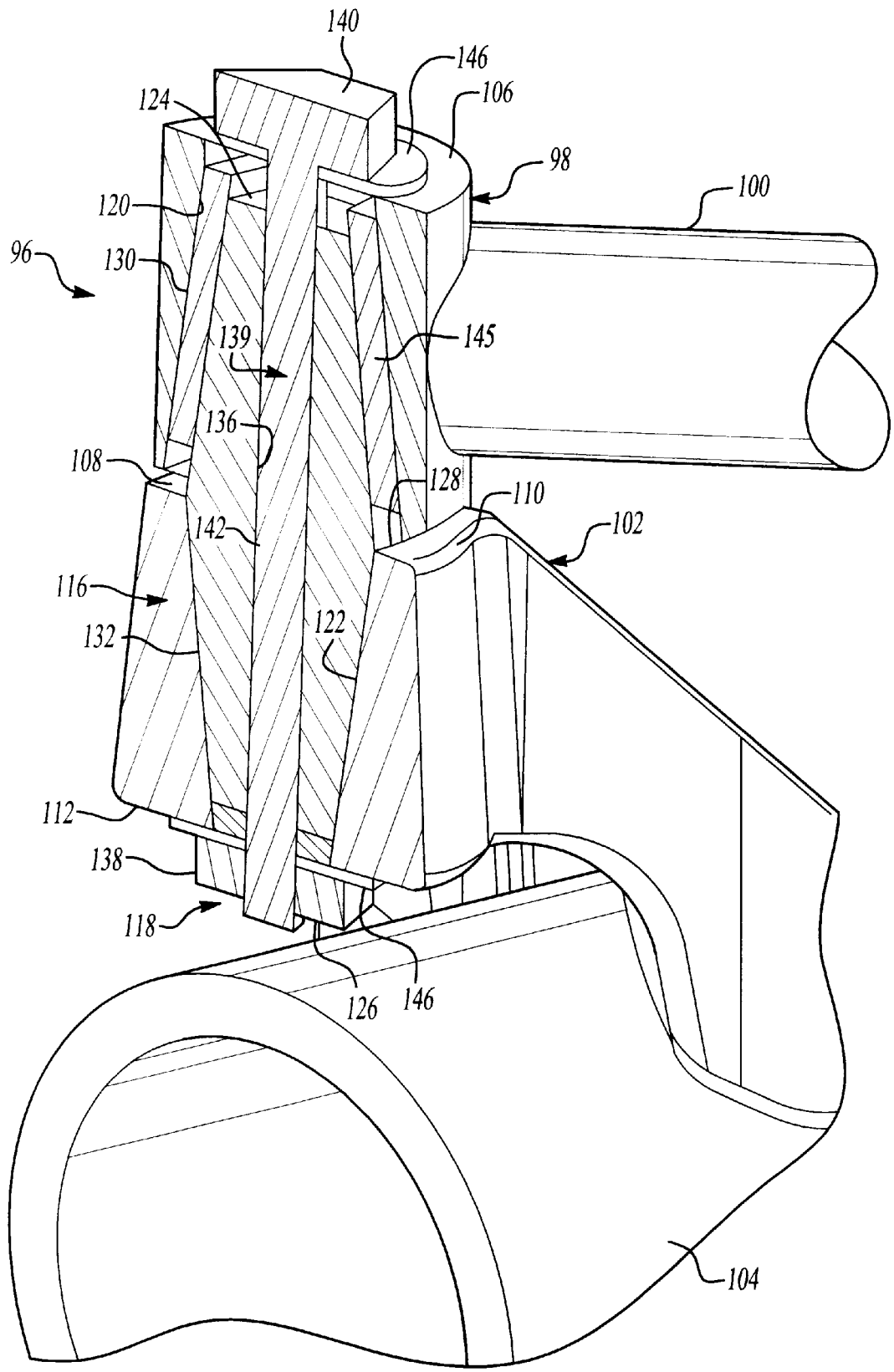
FIG. 6 is partial cross-sectional view of a control rod attachment assembly of the present invention.

A control rod attachment assembly 96 attaches an end 98 of a control rod 100 to a supporting structure 102, as shown in FIG. 6. Supporting structure 102 is welded to axle beam 104 thereby connecting control rod 100 and axle beam 104. Control rod end 98 and supporting structure 102 each have top 106,108 and bottom 110,112 portions, respectively. Bottom portion 110 of control rod end 98 and top portion 108 of supporting structure 102 are adjacent one another. A pin 116 and fastening device 118 secure control rod 100 to supporting structure 102.

Control rod end 98 has a first tapered opening 120 that tapers from bottom portion 110 to top portion 106. Supporting structure 102 has a second tapered opening 122 that tapers from top portion 108 to bottom portion 112. Pin 116 has opposing first 124 and second 126 ends and a portion 128 interposed between ends 124,126. Pin 116 tapers from portion 128 to each end 124,126 thereby forming first 130 and second 132 tapered portions. First 130 and second 132 tapered portions are matingly received within complementary first 120 and second 122 tapered openings, respectively.

Fastening device 118 secures control rod 100 to supporting structure 102 so that first 130 and second 132 tapered portions are seated in first 120 and second 122 tapered openings, respectively. Pin 116 includes a hole 136 therethrough extending from first end 124 to second end 126. In the preferred embodiment, fastening device 118 is received in hole 136 and includes a nut 138 and bolt 139. By using an "off-the-shelf" nut and bolt and eliminating the press fit of the prior art, the attachment assembly 96 is simplified and the cost reduced.

Bolt 139 includes a head 140 with a body 142 extending therefrom with a threaded portion 144 for receiving nut 138. Body 142 is disposed within hole 136, and head 140 and nut 138 secure control rod 100 and supporting structure 102 together by pulling tapered portions 130,132 of pin 116 into tapered openings 120,122. Head 140 and nut 138 coact with top portion 106 of control rod end 98 and bottom portion 112 of supporting structure 102 to accomplish this.

A bushing 145 is interposed between first tapered portion 130 and first tapered opening 120 to improve the wear characteristics between pin 116 and control rod end 98. Washers 146 are interposed between head 140 and nut 138 and top portion 106 of said control rod end 98 and bottom portion 112 of supporting structure 102 to better distribute the tension load of bolt 139.

The control rod/supporting structure configuration shown in FIG. 6 is only one of any number of possible configurations. It is therefore to be understood that the attachment assembly 96 of the present invention is applicable to many control rod/supporting structure configurations.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A vehicle suspension torsion attachment assembly for attaching to a support structure with a hole therethrough comprising:

a torsion member having an end with a first cylindrical bore and a torsion arm extending from said torsion member at an angle to said cylindrical bore;

a bushing disposed within said first cylindrical bore and having a second cylindrical bore; and a plug having a shaft with a flange at one end thereof, said shaft extending through the hole in the support structure and being disposed within said second cylindrical bore, said flange having a plurality of apertures therethrough for receiving fasteners and attaching said plug to the support structure.

2. The assembly as set forth in claim 1 wherein said plug further includes a shoulder adjacent said flange at said one end of said shaft, said shoulder having a perimeter for engagement with the hole and locating said shaft within the hole of the support structure.

3. The assembly as set forth in claim 1 wherein said bushing further includes a flange at one end, and said bushing flange being interposed between said end of said torsion member and said shoulder.

* * * * *